No. 688,447. Patented Dec. 10, 1901.
M. B. STEYERMARK.
SAUSAGE LINKER.
(Application filed Mar. 6, 1901.)
(No Model.) 2 Sheets—Sheet 2.
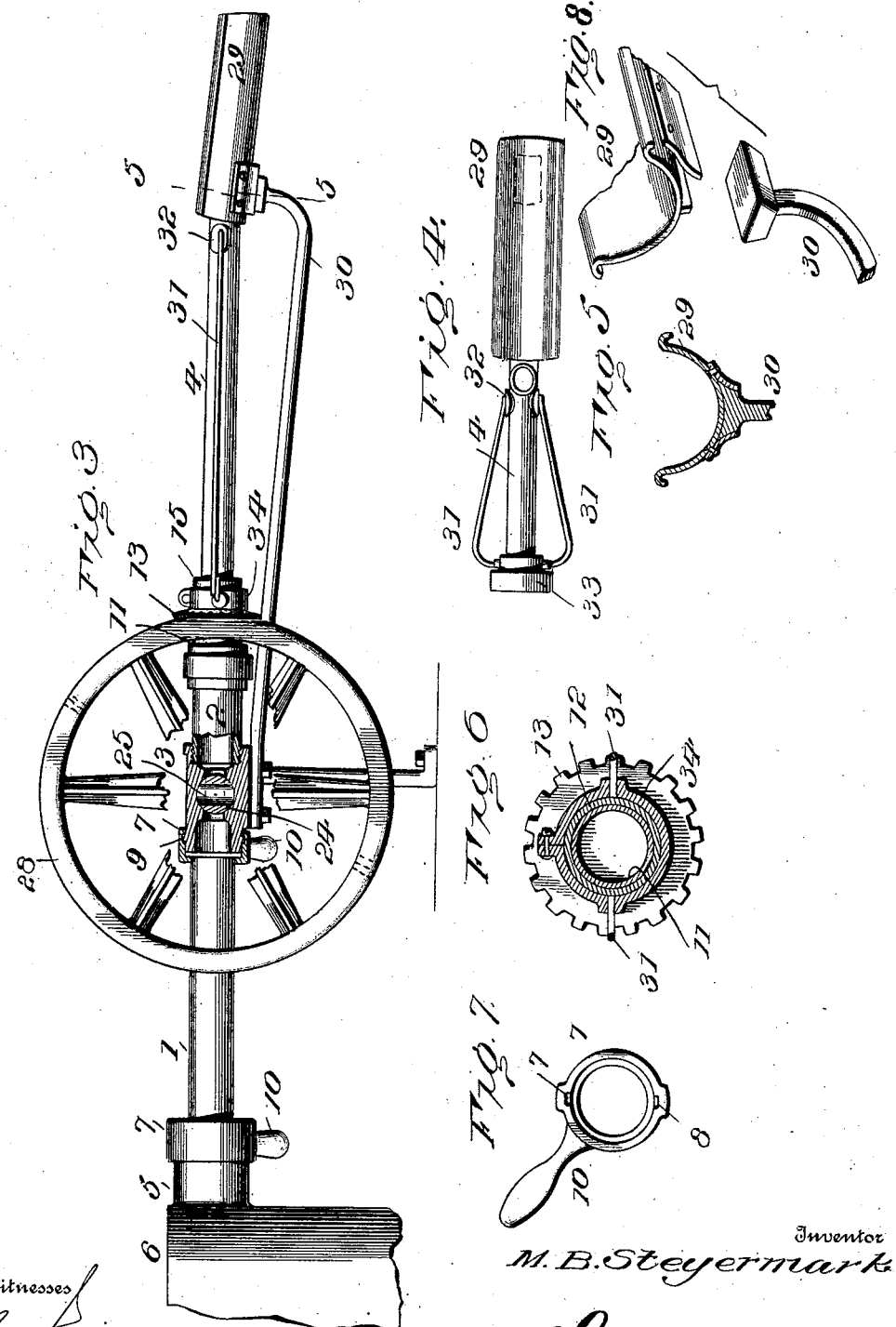
Witnesses
Inventor
M. B. Steyermark
By ... Attorneys

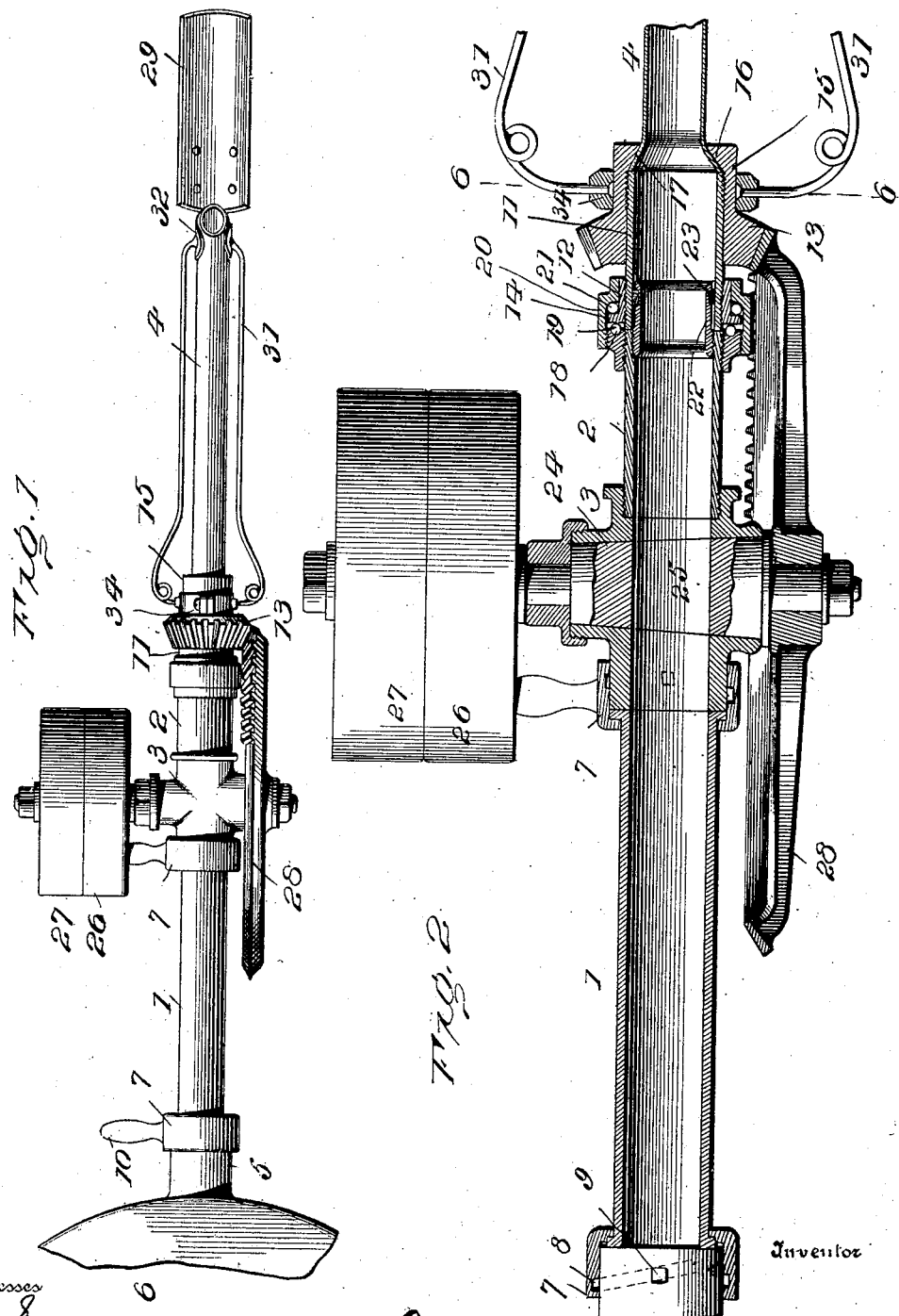
No. 688,447. Patented Dec. 10, 1901.
M. B. STEYERMARK.
SAUSAGE LINKER.
(Application filed Mar. 6, 1901.)
(No Model.) 2 Sheets—Sheet 1.

UNITED STATES PATENT OFFICE.

MAURICE B. STEYERMARK, OF ST. LOUIS, MISSOURI.

SAUSAGE-LINKER.

SPECIFICATION forming part of Letters Patent No. 688,447, dated December 10, 1901.

Application filed March 6, 1901. Serial No. 50,114. (No model.)

*To all whom it may concern:*

Be it known that I, MAURICE B. STEYERMARK, a citizen of the United States, residing at St. Louis, in the State of Missouri, have invented certain new and useful Improvements in Sausage-Linking Machines; and I do hereby declare the following to be a full, clear, and exact description of the invention, such as will enable others skilled in the art to which it appertains to make and use the same.

This invention has relation to machines for twisting the filled casing of sausage to form links, the purpose being uniformity of links and despatch of operation, combined with simplicity of mechanism, light-running parts, and efficiency in result.

For a full description of the invention and the merits thereof and also to acquire a knowledge of the details of construction of the means for effecting the result reference is to be had to the following description and drawings hereto attached.

While the essential and characteristic features of the invention are necessarily susceptible of modification, still the preferred embodiment of the invention is illustrated in the accompanying drawings, in which—

Figure 1 is a top plan view of a machine embodying the invention. Fig. 2 is a longitudinal section thereof. Fig. 3 is a side elevation, parts being broken away. Fig. 4 is a top plan view showing the rest reversed. Fig. 5 is a transverse section on the line 5 5 of Fig. 3. Fig. 6 is a section on the line 6 6 of Fig. 2. Fig. 7 is a detail view in elevation of a coupling. Fig. 8 is a detail perspective view of the adjacent end portions of the rest and supporting-arm therefor.

Corresponding and like parts are referred to in the following description and indicated in all the views of the drawings by the same reference characters.

In its organization the machine comprises longitudinally-alined tubes 1 and 2, an interposed valve 3, and a rotatable tube 4, the several parts being in line. The tube 1 is flanged at its outer end and is adapted to be connected with the outlet 5 of a sausage filling or stuffing machine 6 of any make by means of a coupling 7, the latter consisting of a ring or collar having an inner flange at one end to engage with the outer flange of the tube 1 and having an inner spiral groove 8 to receive oppositely-disposed lugs 9 of the spout or outlet 5, said collar being provided with a handle 10 for rotation when it is required to couple or to disconnect the parts.

A short tube 11, equal in diameter to the tubes 1 and 2 and in line therewith, has its opposite end portions exteriorly threaded to receive, respectively, a collar 12 and a pinion 13. The collar 12 is provided with an outer flange 14, and the pinion 13 is formed with a tubular extension 15, terminating in an inner flange 16, which is outwardly convergent to receive the inner flared end 17 of the revolving tube 4. The inner extremity of the flared part 17 bears against the outer end of the tube 11 and is held in place by the beveled portion of the flange 16. This construction admits of the tube 4 being removed and replaced by a tube of different size, according to the desired diameter of the completed sausage. A collar 18 is fitted by a screw-thread connection to the outer end of the tube 2, and its outer end is grooved to receive balls 19, which are interposed between the collar 18 and the opposing side of the flange 14. A collar 20 has screw-thread connection with the collar 18, and its opposite end is contracted to snugly embrace the collar 12 and retain in place balls 21, placed upon opposite sides of the flange 14. The parts 2, 18, and 20 are stationary, whereas the parts 11 and 12 rotate. Hence it will be understood that the balls 19 and 21 reduce the friction between the moving parts to the smallest amount possible. A sleeve 22 overlaps the joint formed between the tubes 2 and 11 and is fitted to the outer end portion of the tube 2 by a screw-thread connection. The opposite ends of the tube 22 flare, so as not to obstruct the passage of the sausage-meat and to prevent lodgment of the same and facilitate the cleaning of the machine when not required for further immediate service. A gasket or packing 23 is fitted to the outer end of the tube 22 and provides a close joint between it and the tube 11 and prevents any of the meat-juices reaching the joint and gumming the ball-bearings. This packing also prevents oil from the ball-bearings reaching the interior of the tube.

The valve 24 is of the plug type and is tapering, and its opening 25 is located to aline with the bore of the tubes 1 and 2. When the machine is in operation, rotary motion is imparted to the valve 24 either by hand or other power, and, as shown, pulleys 26 and 27 are mounted upon its stem, one of the pulleys being tight and the other loose. A driver 28 is also connected with the valve 24 and by preference is attached to the end opposite that bearing the pulleys 26 and 27, so as to equalize the strain and load. This driver 28 consists of a mutilated gear-wheel of the bevel type, its toothed portion being adapted to mesh with the teeth of the pinion 13, which is likewise of the bevel variety. The opening 25 of the valve and the toothed portion of the driver 28 are so related that when the teeth of the driver and the pinion 13 are in mesh communication between the tubes 1 and 2 is cut off, and when the teeth of the driver and the pinion are out of mesh the opening 25 of the valve is in line with the bore of the tubes 1 and 2, so as to establish communication between them.

The rest 29 is of oblong form and curved between its longitudinal edges and is attached to the outer end of an arm 30, which is connected at its inner end to a convenient portion of the machine-frame. The attachment between the rest 29 and arm 30 is at one end of the rest, and the latter inclines slightly from the horizontal. When a smaller and shorter tube 4 is employed, as shown in Fig. 4, the rest 29 is reversed, as indicated in said figure, thereby obviating the necessity for providing two rests for the different-sized tubes.

The sausage casing or gut is fitted to the tube 4 in the manner well understood in the art and is prevented from slipping therefrom by means of spring-holders 31, having expanded portions 32 at their outer ends to embrace the outer end portion of the tube 4 and create sufficient friction upon the sausage-casing to prevent its slipping too rapidly from the tube when the machine is in operation. The spring-holders 31 consist of wire, which may be attached to a collar 33, as shown in Fig. 4, to make screw-thread connection with the outer end portion of the part 15, or they may be attached to a split collar 34, which is clamped to the said part 15.

The tube 1 forms a connection between the sausage stuffing or filling machine and the valve-casing of the linking-machine and is attached to each coupling 7, as indicated most clearly in Figs. 1 and 2. When in operation, the valve 24 is rotated continuously in the same direction and at the required rate of speed, the sausage-meat filling the casing in the manner well understood. The filling is intermittent by reason of the opening and closing of the valve 24, and during the interval of closure of the valve 24 the linking mechanism is in operation to twist the casing so as to form the links, as will be readily appreciated.

Having thus described the invention, what is claimed as new is—

1. In a sausage-linking machine, oppositely-disposed tubes, an interposed valve, a terminal rotary tube for reception of the sausage-casing, means connected with the valve for intermittently rotating the outer tube, and an inner tube spanning the joint formed between the rotary tube and the adjacent stationary tube, said inner tube having its end portions outwardly flared, and a packing interposed between the said inner tube and the rotary tube, substantially as specified.

2. In a sausage-linking machine, oppositely-disposed tubes, an interposed valve, a rotary tube having an outer flange, connecting means between the rotary tube and the adjacent stationary tube, and balls upon opposite sides of the outer flange of the rotary tube and interposed between said flange and the connecting means between the two tubes, substantially as specified.

3. In a sausage-linking machine, a valve, a tube 2 connected with the valve-casing, a collar 18 fitted to the outer end of the tube 2, a rotary tube 11, a collar 12 fitted to the tube 11 and having an outer flange, a collar 20 having screw-thread connection with the collar 18 and connecting the tubes 11 and 2, two sets of balls interposed between the outer flange of the collar 12 and the collars 18 and 20, and a tube 22 spanning the joint formed between the tubes 2 and 11 and connected with the tube 2, and a packing 23 interposed between the tube 2 and tube 11, substantially as set forth.

In testimony whereof I affix my signature in presence of two witnesses.

MAURICE B. STEYERMARK. [L. S.]

Witnesses:
A. LANDAU,
J. A. ROGERS.